May 15, 1951 R. C. GADDIS 2,552,953
SELF-UNLOADING VEHICLE

Filed June 26, 1948 2 Sheets-Sheet 1

INVENTOR.
ROY C. GADDIS
BY R. Donald Pitts
AGENT.

May 15, 1951          R. C. GADDIS          2,552,953

SELF-UNLOADING VEHICLE

Filed June 26, 1948          2 Sheets—Sheet 2

INVENTOR.
ROY C. GADDIS
BY
R. Donald Pitts
AGENT.

UNITED STATES PATENT OFFICE 2,552,953

SELF-UNLOADING VEHICLE

Roy C. Gaddis, Cedar Rapids, Iowa

Application June 26, 1948, Serial No. 35,419

2 Claims. (Cl. 214—83.36)

This invention relates to wagon boxes and particularly to the self-unloading type of wagon box.

Self-unloading mechanisms have been applied, in the past, to many types of vehicles for use in handling various kinds of material such as building materials, sand, gravel, agricultural lime, fertilizer and grain, as well as other bulk materials. Of the several types of unloading mechanisms employed and including tilting wagon boxes, boxes having slanted bottoms, screw conveyor types, and those having chain driven drag bars, the latter type has found considerable favor in a number of fields due, partly, to its simplicity, ease of operation and dependability.

The width of this type of discharge mechanism has, in the past, been limited, in general, to the width of the chassis of the vehicle on which it was to be mounted. Many applications call for or require a large volume discharge or a discharge to be made over the full width of a relatively wide, flat-bed wagon box. This has generally been accomplished by using a vehicle having a special wide chassis and a correspondingly wide wheel base.

This necessity for an out-size supporting vehicle has many obvious disadvantages, and it is accordingly a primary object of my invention to provide a wagon box structure incorporating a self unloading mechanism which may be constructed in any width required, within reason, and without being limited by the relative narrow width of the standard vehicle chassis.

Another object of my invention is the provision of an improved self-unloading wagon box particularly well suited to the handling of large volume, light weight bulk materials.

Still another object of my invention is the provision of a wide, flat-bed, self-unloading type wagon box which may be mounted upon a standard width vehicle chassis.

A further feature and more specific object of my invention is the provision, in such a wagon box, of a novel and improved supporting and mounting structure which is adapted to incorporate a relatively wide chain and drag-bar type of discharge conveyor.

Another object of my invention is the provision of an improved double-truss supporting structure for a wide flat bed wagon box.

Other and further features and objects of the invention will be more apparent to those skilled in the art upon a consideration of the accompanying drawings and following specifications, wherein is disclosed a single exemplary embodiment of the invention, with the understanding, however, that such changes may be made therein as fall within the scope of the appended claims, without departing from the spirit of the invention.

Figure 1:
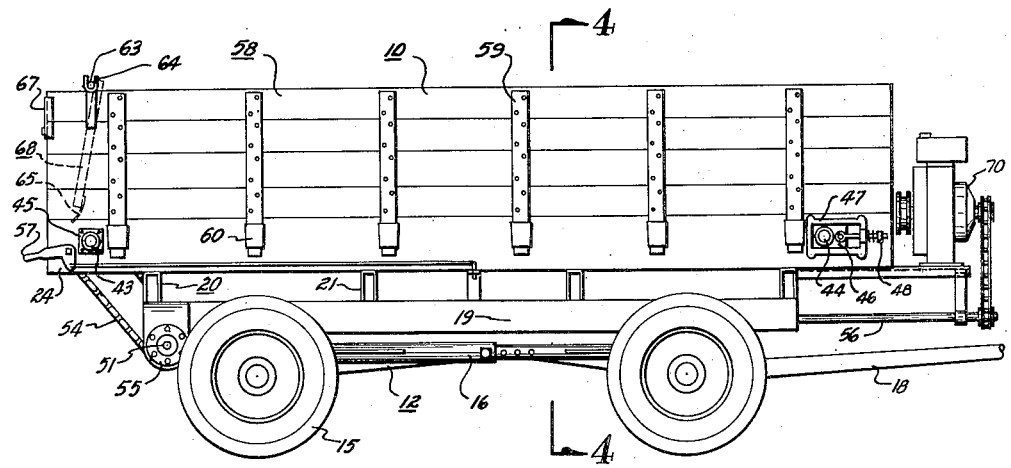
Figure 1 is a view in side elevation of a self-unloading, wide, flat-bed wagon box constructed in accordance with a preferred embodiment of my invention.
Figure 2:
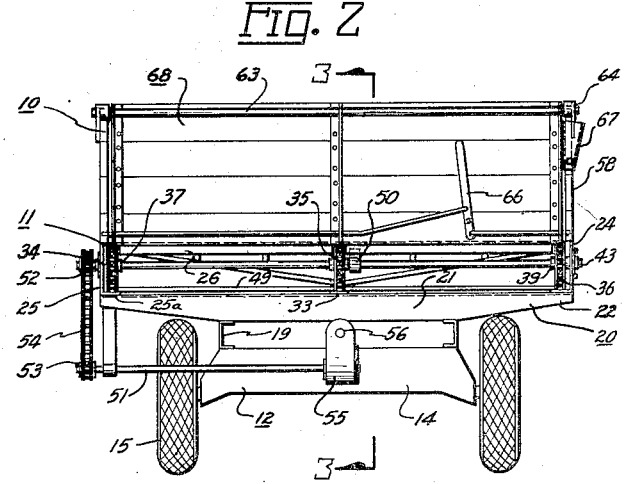
Figure 2 is a rear elevational view of the wagon box illustrated in Figure 1.

Referring now to the drawings, in which a wide, flat-bed wagon box, indicated generally by the numeral 10, and incorporating a self unloading, conveyor mechanism 11, is mounted upon and carried by a wheeled chassis 12. This wheeled chassis may be either a power driven vehicle, such as a truck, or a drawn vehicle such as the farm wagon or trailer illustrated.

The farm wagon chassis consists, generally, of spaced front and rear bolsters, 13 and 14 respectively, mounted upon wheels and pneumatic tires 15 and secured together by means of an adjustable, tubular, telescoping draw bar 16. The front bolster may incorporate a fifth wheel structure, as indicated at 17, or the front wheels may be pivotally mounted on the front bolster in any other suitable manner and all in accordance with common practice. A tongue or tow bar 18 is also attached to the front bolster in any suitable manner.

The chassis is of standard width, and mounted upon the upper surfaces of the bolsters are a pair of spaced, longitudinally extending channel iron beams 19 corresponding to the main frame members of a standard vehicle chassis. These longitudinal beams extend beyond the bolsters, and mounted transversely thereon are a plurality of longitudinally spaced, transverse, lower cantilever girder or beam structures 20. These members may be of generally U shape or channel section having the side portions 21 relatively wide and tapered adjacent the ends as at 22. These channel shaped members 20 are secured by welding, or other suitable means, and in inverted position to the upper surfaces of the chassis beams 19, and are of a length equal to the desired width of the wagon box which, in the present embodiment, is approximately twice the width of the main chassis.

Mounted upon the outer ends 22 of these lower transverse cantilever beams are a pair of L-shaped steel sills 24 and 25, the short legs 24a and 25a respectively of which are secured to members 20 by welding or the like, and in such manner as will leave the inner surfaces of the short legs smooth for purposes which will be hereinafter explained.

The floor plate 26 is preferably of steel plate and is mounted generally in the plane of the upper edges of the sills 24 and 25 and secured thereto by welding. Supporting and reinforcing this floor plate are a plurality of transverse, fabricated, upper truss members 27, each one of which includes a channel iron stringer 28 welded at its ends to the inner walls of the sills. The V-shaped tension member 29 of each truss is of iron bar or rod secured at its ends, by welding, adjacent the ends of the stringer 28, a strut or compression member 30 being secured in place between the lowermost portion of the tension member and the center of the stringer.

Intermediate struts 31 and 32 further increase the rigidity of the truss. The struts 30 are of such length as will leave a clear space between the lower end of each truss and the top surface of a longitudinally extending chain slide rail 33. This slide rail is secured to the upper surfaces of the transverse, lower cantilever beams and serves, along with the inside top surfaces of the steel sills 24 and 25, to support the lower or "return" portions of the conveyor 11.

It should be noted that the entire load carried by the floor plate is transferred by the floor plate and the upper truss members 27 to the sills 24 and 25 and by them to the transverse cantilever beams 20.

Figure 3:
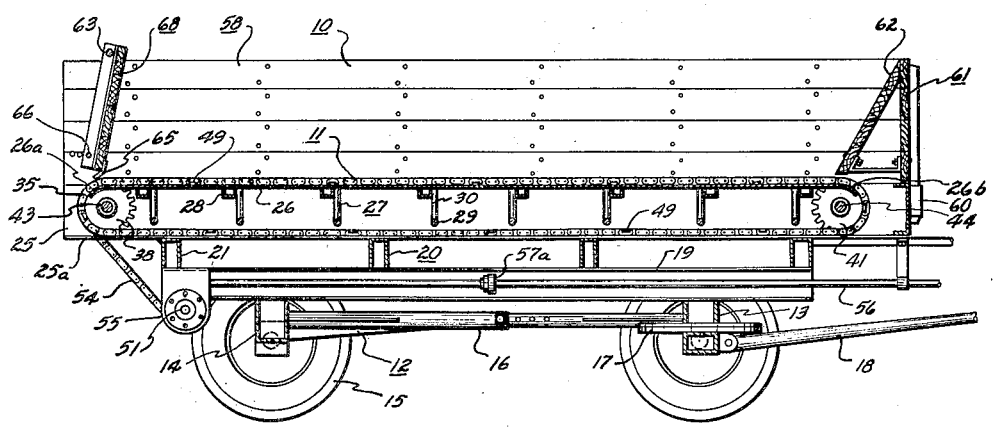
Figure 3 is a view in vertical, longitudinal section of my wagon box.
Figure 4:
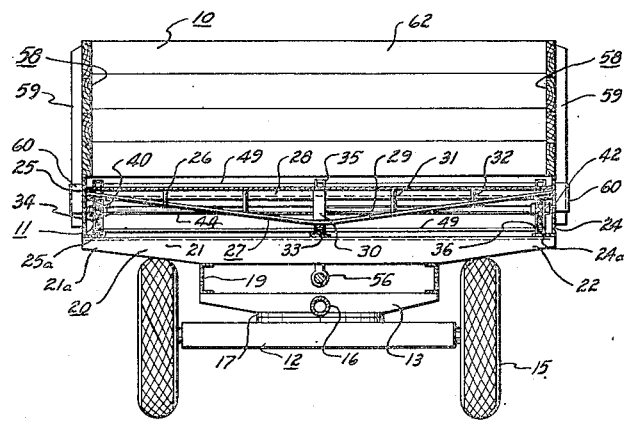
Figure 4 is a view in vertical, transverse section of the same wagon box.

The conveyor mechanism includes a plurality of transversely spaced, roller type chains 34, 35 and 36 trained over drive sprockets 37, 38 and 39 at the rear of the box and idler sprockets 40, 41 and 42 adjacent the forward end of the box. The sprockets are mounted upon and secured to the transverse sprocket shafts 43 and 44, the ends of which are journaled in flange bearings 45 and 46 respectively. These bearings are mounted upon the sills 24 and 25 a sufficient distance above center to permit the upper reaches of the chains to ride on the floor plate as best illustrated in Figures 3 and 4, and the lower reaches of the chains to ride on the slides 24a, 25a and 33. The forward bearings 46 are longitudinally slideable in cages or frames 47, and spring-biased, adjusting screws 48 are provided to remove excess play from the chains.

The floor plate 26 is notched out to accommodate the sprockets and the forward and rear edges of the floor plate are curved downwardly, as indicated at 26a and 26b, to clear the conveyor slats or drag bars 49. The roller chains are provided with bracket links at spaced intervals to which the slats or drag bars are attached in the usual manner.

Each sprocket shaft is preferably supported in the center by a bearing 50 secured to the underside of the floor plate. The sprocket drive shaft is powered from a lower transverse drive shaft 51 through spur gears 52 and 53 and a roller chain 54, the shaft 51 being driven through a worm and gear drive indicated at 55 from a main longitudinal drive shaft 56. A sliding jaw clutch 57a is preferably mounted between two sections of the main drive shaft and operated by means of a control lever 57. This drive shaft may be driven from the power take-off of a tractor or from power means mounted directly upon the wagon such as the gas engine illustrated at 70.

Side walls 58 are constructed of wood or other suitable material and mounted above the sills by means of stakes 59 set into pockets 60 welded to the sills. The front wall 61 includes a sloping inner wall 62 adapted to shield the forward end of the conveyor.

The tail gate 68 is pivotally mounted at the top on a transverse rod 63 received in U-shaped sockets 64 on the side walls. A flexible sealing member 65 is attached to the lower edge of the tail gate and the entire gate is adapted to be secured in one of a plurality of positions by means of a latching member 66. The gate may be supported in fully opened position by means of a spring-biased latch 67 or may be removed entirely.

The simple structural framework for a wagon box such as I have herein described, may be built in any desired size, but is particularly well adapted to provide a full width discharge for a wide-bed wagon box mounted upon a narrow chassis. The floor plate receives adequate support without the supports interfering with the operation of the conveyor and the conveyor is well concealed and protected.

A wagon box constructed in accordance with my invention is well adapted for the handling of light-weight, bulky material such as chopped hay and grain or heavy material such as sand. The material may be discharged in a thin wide "sheet" or a load of light bulky material, such as hay, may be discharged substantially en masse by first removing the tailgate.

Although I have described a specific embodiment of my invention, it is apparent that modifications thereof may be made by those skilled in the art. Such modifications may be made without departing from the spirit and scope of my invention as set forth in the appended claims.

I claim as my invention:

1. In a vehicle including a chassis, a flat-bed body of substantially greater width than the chassis and a chain and drag bar type of conveyor operable over substantially the entire width of the flat-bed body, means for mounting the body on the chassis comprising a plurality of longitudinally spaced, transverse, cantilever beam members mounted upon and overhanging the chassis, longitudinal sill members having inwardly extending bottom flange portions supported by the outer ends of the lower cantilever beam members, a floor plate, and a plurality of longitudinally spaced, transverse, upper truss members mounted between the sill members and supporting the floor plate, the upper truss members being spaced above the cantilever beam members to permit passage therebetween of portions of the conveyor, and the lower portions of the conveyor adapted to ride on the flange portions of the sill members.

2. In a device of the character described for mounting upon a wheeled chassis, longitudinal frame members, a plurality of transverse frame members forming cantilever beams on opposite sides of the longitudinal frame members, longitudinal sills mounted upon the outer ends of the cantilever beams, a plurality of transverse, upper truss members supported between the sills and in spaced relation to the cantilever beams, a floor plate mounted upon the upper truss members, a sprocket drive shaft and a sprocket idler shaft mounted for rotation between the sills and adjacent opposite ends of the floor plate, drive sprockets and idler sprockets respectively mounted thereon adjacent the sills, and conveyor chains carried by the sprockets, the upper portions of said chains extending over the upper surface of the floor plate and the lower portions of the said chains extending between the spaced cantilever beams and upper truss members.

ROY C. GADDIS.

REFERENCES CITED

The following references are of record in the file of this patent:

UNITED STATES PATENTS

| Number | Name | Date |
|---|---|---|
| 1,403,307 | Fisher | Jan. 10, 1922 |
| 1,684,673 | Hollnagel | Sept. 18, 1928 |
| 1,905,009 | Standish | Apr. 25, 1933 |
| 2,189,139 | Fox | Feb. 6, 1940 |
| 2,239,089 | Fageol | Apr. 22, 1941 |
| 2,346,130 | Evans | Apr. 11, 1944 |
| 2,426,582 | Austin | Sept. 2, 1947 |
| 2,434,718 | Recker | Jan. 20, 1948 |

FOREIGN PATENTS

| Number | Country | Date |
|---|---|---|
| 442,391 | Great Britain | Feb. 7, 1936 |